US009343095B2

(12) United States Patent  
Takei et al.

(10) Patent No.: US 9,343,095 B2  
(45) Date of Patent: *May 17, 2016

(54) HEAD GIMBALS ASSEMBLY, METHOD FOR MANUFACTURING THERMAL-ASSISTED MAGNETIC RECORDING AND MANUFACTURING EQUIPMENT OF THERMAL-ASSISTED MAGNETIC RECORDING

(71) Applicant: HGST Netherlands B.V., Amsterdam (NL)

(72) Inventors: Hisako Takei, Nishi-Tokyo (JP); Yasuhiko Iwanabe, Arakawa-Ku (JP); Harukazu Miyamoto, Higashimurayama (JP); Masaki Mukoh, Fuchu (JP)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/846,539

(22) Filed: Sep. 4, 2015

(65) Prior Publication Data

US 2015/0380035 A1 Dec. 31, 2015

Related U.S. Application Data

(63) Continuation of application No. 14/095,013, filed on Dec. 3, 2013, now Pat. No. 9,165,572.

(51) Int. Cl.

| G11B 11/00 | (2006.01) |
|---|---|
| G11B 5/31 | (2006.01) |
| G11B 5/48 | (2006.01) |
| G11B 5/60 | (2006.01) |

(Continued)

(52) U.S. Cl.
CPC .............. *G11B 5/6082* (2013.01); *G02B 1/116* (2013.01); *G11B 5/314* (2013.01); *G11B 5/40* (2013.01); *G11B 5/4866* (2013.01); *G11B 5/6088* (2013.01); *G11B 2005/001* (2013.01); *G11B 2005/0021* (2013.01)

(58) Field of Classification Search
CPC ........ G11B 5/314; G11B 5/40; G11B 5/4866; G11B 2005/001; G11B 2005/0021; G11B 11/10554; G11B 11/1058; G11B 7/1206; G11B 5/6088; G11B 5/6082; G02B 1/116
USPC ................... 369/13.33, 13.13, 112, 27, 13.01
See application file for complete search history.

(56) References Cited

U.S. PATENT DOCUMENTS

| 6,687,277 B2 | 2/2004 | Hatakoshi et al. |
|---|---|---|
| 6,762,977 B1 | 7/2004 | Gage et al. |

(Continued)

OTHER PUBLICATIONS

Mark H. Kryder et al.; "Heat Assisted Magnetic Recording"; U.S. Department of Commerce, National Institute of Standards and Technology, Advanced Technology Program; Apr. 2008; 26 pages.

*Primary Examiner* — Ali Neyzari  
(74) *Attorney, Agent, or Firm* — Patterson & Sheridan, LLP

(57) ABSTRACT

A HAMR head includes an anti-reflecting (AR) coating on a side opposite (e.g., a flex side) of the air bearing surface (ABS). The anti-reflective coating may include one or more anti-reflective layers. The anti-reflective coating reduces the amount of light reflected back towards a light source unit. A shading layer may be disposed on the anti-reflective coating and may function as a contact electrode as well as reducing stray light escaping from the laser, thus reducing the amount of stray light reaching the ABS.

25 Claims, 10 Drawing Sheets

(51) Int. Cl.
   *G11B 5/40*  (2006.01)
   *G02B 1/116* (2015.01)
   *G11B 5/00*  (2006.01)

(56) References Cited

U.S. PATENT DOCUMENTS

| | | |
|---|---|---|
| 8,139,464 B2 | 3/2012 | Peng |
| 8,223,596 B2 | 7/2012 | Chou et al. |
| 8,238,202 B2 | 8/2012 | Schreck et al. |
| 8,310,903 B1 | 11/2012 | Takayama et al. |
| 8,363,515 B1 | 1/2013 | Chou et al. |
| 8,369,203 B2 | 2/2013 | Komura et al. |
| 8,750,082 B1 | 6/2014 | Shimazawa et al. |
| 8,760,979 B1 | 6/2014 | Chou et al. |
| 8,767,348 B1 | 7/2014 | Tanaka et al. |
| 9,165,572 B2 * | 10/2015 | Takei .................. G11B 5/6088 |
| 2010/0007980 A1 | 1/2010 | Kim et al. |
| 2010/0128576 A1 | 5/2010 | Fang et al. |

* cited by examiner

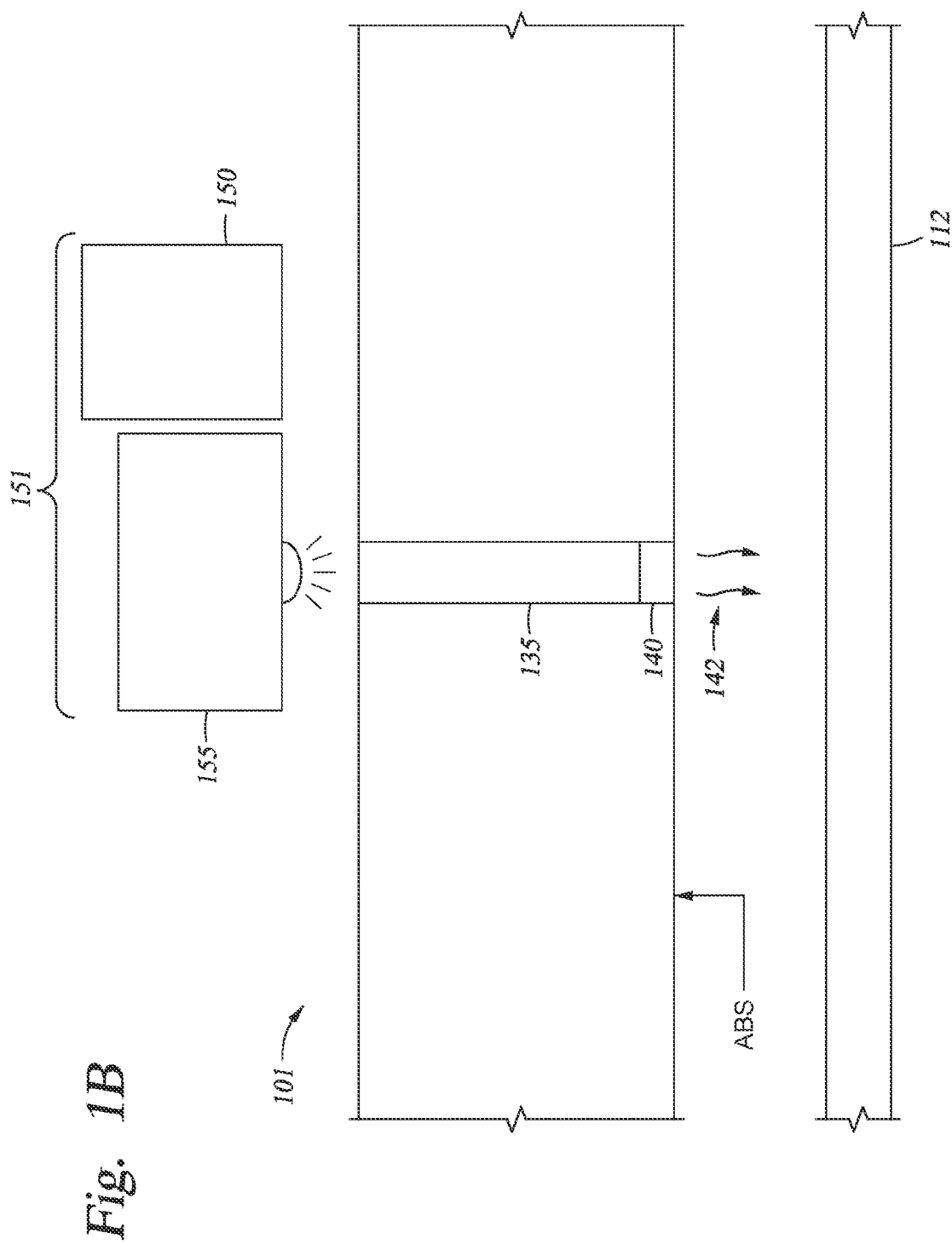

HEAD GIMBALS ASSEMBLY, METHOD FOR MANUFACTURING THERMAL-ASSISTED MAGNETIC RECORDING AND MANUFACTURING EQUIPMENT OF THERMAL-ASSISTED MAGNETIC RECORDING

CROSS-REFERENCE TO RELATED APPLICATIONS

This application is a continuation of U.S. patent application Ser. No. 14/095,013, filed Dec. 3, 2013, now U.S. Pat. No. 9,165,572 which is herein incorporated by reference.

BACKGROUND OF THE INVENTION

1. Field of the Invention

Embodiments of the present invention generally relate to data storage systems, and more particularly, to write heads for thermally assisted recording.

2. Description of the Related Art

Higher storage bit densities in magnetic media used in hard disk drives have reduced the size (volume) of magnetic bits to the point where the magnetic bit dimensions are limited by the grain size of the magnetic material. Although grain size can be reduced further, the data stored within the magnetic bits may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" once the media cools to ambient temperatures. This technique is broadly referred to as "thermally assisted (magnetic) recording" (TAR or TAMR), "energy assisted magnetic recording" (EAMR), or "heat-assisted magnetic recording" (HAMR) which are used interchangeably herein. It can be applied to longitudinal and perpendicular recording systems as well as "bit patterned media". Heating of the media surface has been accomplished by a number of techniques such as focused laser beams or near-field optical sources. However, several issues exist when utilizing focused laser beams or near-field optical sources. One such issue is the reflection of laser light.

During recording, a wave guide of a slider is irradiated with laser light. As light is emitted from the laser, undesirable deterioration of laser light characteristics occurs due to interference with reflected laser light from a flex surface. Reflected laser light (for example, light reflected from a slider) interferes with the laser light coming from the light source, thus deteriorating or changing characteristics of the light emitted from the source, such as light wavelength. Previous solutions have proposed using an isolator, e.g., an optical element having a size of several centimeters, in order to reduce the amount of light returned to the light source. However, due to the size of the isolator, it is difficult to include an isolator within a write head, which includes components on a scale of microns.

In order to overcome deterioration of laser light characteristics, JP 2011-187111 proposes using a bent or slanted waveguide having a large diameter. However, integration of such a waveguide into a slider complicates the structure of the waveguide, and can lead to yield degradation and increased costs of production.

SUMMARY OF THE INVENTION

Embodiments of the present invention generally relate to a HAMR head. The HAMR head includes an anti-reflecting (AR) coating on a side opposite (e.g., a flex side) of the air bearing surface (ABS). The anti-reflective coating may include one or more anti-reflective layers. The anti-reflective coating reduces the amount of light reflected back towards a light source unit. A shading layer may be disposed on the anti-reflective coating and may function as a contact electrode as well as reducing stray light escaping from the laser, thus reducing the amount of stray light reaching the ABS.

In one embodiment, a HAMR head comprises a slider having an air bearing surface and a flex side opposite the air bearing surface, an anti-reflective coating deposited on the flex side, a shading layer disposed on the anti-reflective coating, the shading layer having an opening formed therethrough, and a light source positioned over the shading layer.

In another embodiment, a HAMR head comprises a slider having an air bearing surface and a flex side opposite the air bearing surface, an anti-reflective coating deposited on the flex side, the anti-reflective coating having a reflectance less than about 0.1 percent, a shading layer comprising chromium disposed on the anti-reflective coating, the shading layer having an opening formed therethrough, and a light source positioned over the shading layer.

In another embodiment, a HAMR head comprises a slider having an air bearing surface and a flex side opposite the air bearing surface, an anti-reflective coating deposited on the flex side, the anti-reflective coating having a reflectance less than about 0.1 percent, and comprising at least one material selected from the group consisting of silicon dioxide, diamond-like carbon, titanium dioxide, and tantalum pentoxide, a shading layer comprising a metal thin film disposed on the anti-reflective coating, the shading layer having an opening formed therethrough, the opening having a diameter within a range of about 2 micrometers to about 8 micrometers, and a light source positioned over the shading layer, the light source comprising a laser.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 1A-1E illustrate a hard disk drive system, according to embodiments of the invention.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the present invention generally relate to a HAMR head. The HAMR head includes an anti-reflecting (AR) coating on a side opposite (e.g., a flex side) of the air bearing surface (ABS). The anti-reflective coating may include one or more anti-reflective layers. The anti-reflective coating reduces the amount of light reflected back towards a light source unit. A shading layer may be disposed on the anti-reflective coating and may function as a contact electrode as well as reducing stray light escaping from the laser, thus reducing the amount of stray light reaching the ABS.

Figure 1A:
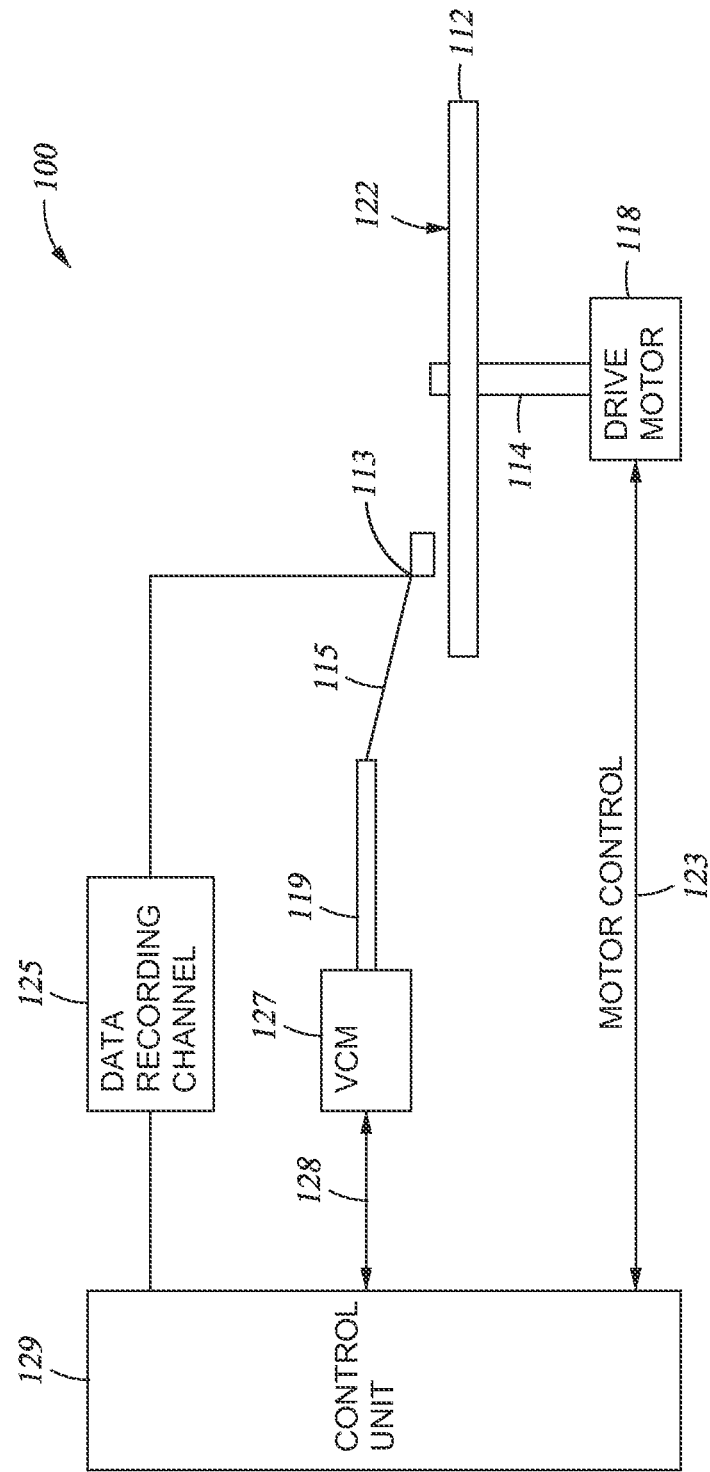

FIGS. 1A-1E illustrates a hard disk drive system 100, according to embodiments of the invention. As shown in FIG. 1A, at least one rotatable magnetic disk 112 is supported on a spindle 114 and rotated by a disk drive motor 118. The magnetic recording on each disk is in the form of annular patterns of concentric data tracks on the magnetic disk 112.

At least one slider 113 is positioned near the magnetic disk 112. Each slider 113 is supported by one or more head gimbal assemblies (HGA), such as TAR enabled write head 101. As the magnetic disk 112 rotates, the slider 113 moves radially in and out over a disk surface 122 so that the HGA may access different tracks of the magnetic disk 112 where desired data are written. Each slider 113 is attached to an actuator arm 119 by way of a suspension 115. The suspension 115 provides a slight spring force which biases the slider 113 towards the disk surface 122. Each actuator arm 119 is attached to an actuator 127. The actuator 127 as shown in FIG. 1A may be a voice coil motor (VCM). The VCM comprises a coil movable within a fixed magnetic field, the direction and speed of the coil movements being controlled by the motor current signals supplied by control unit 129.

During operation of a TAR or HAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 slightly above the disk 112 surface by a small, substantially constant spacing during normal operation. The radiation source heats up the high-coercivity media so that the write elements of the HGA may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

FIG. 1B is a cross sectional schematic of a TAR enabled write head 101, according to one embodiment described herein. The head 101 includes a laser diode 155, and a submount 150 that facilitates cooling of the laser diode 155. The laser diode 155 and the submount 150 may herein be referred to together as a light source 151. The laser diode 155 may be placed directly on the head 101 or radiation may be delivered from a laser diode 155 located separate from the slider through an optical fiber or waveguide. The head 101 includes a waveguide 135 and a near-field generator 140. The waveguide introduces light energy to the near-field generator 140. Laser light from the laser diode 155 propagates through the waveguide 135 to the a near-field generator 140, which generates optical near-field light by excitation of plasmons, thereby forming a nano-sized thermal spot on the disk 112 and creating a beam spot much smaller than the diffraction limit. As shown by arrows 142, this optical energy emits from the near-field generator 140 to the surface of the disk 112 below the ABS of the head 101. The embodiments herein, however, are not limited to any particular type of radiation source or technique for transferring the energy emitted from the radiation source to the ABS.

Figure 1C:
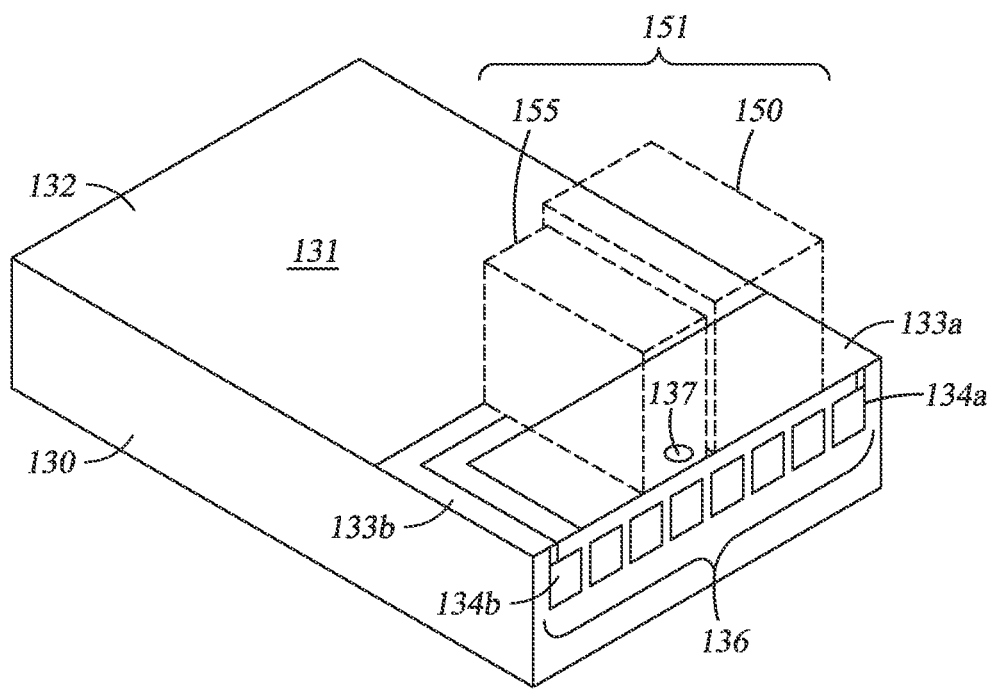
Figures 1D, 1E:
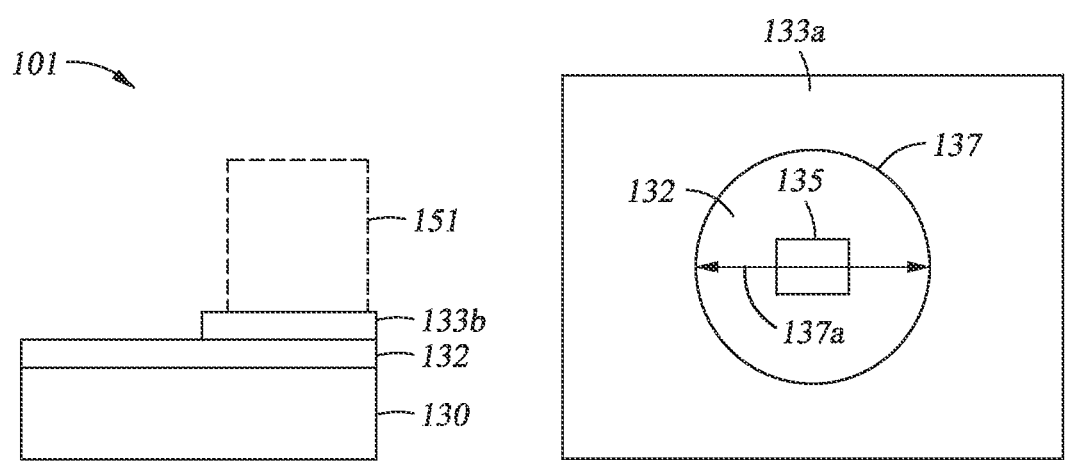

FIG. 1C illustrates a perspective view of the TAR enabled write head 101. FIG. 1D illustrates a side view of the TAR enabled write head 101. The TAR enabled write head 101 includes a body, such as a slider 130. A side 131 of the slider 130 opposite the ABS includes an anti-reflective coating 132 thereon. A metal thin film, such as a partitioned shading layer 133 including portions 133a, 133b is positioned over a portion of the anti-reflective coating 132 between the anti-reflective coating 132 and the light source 151. The shading layer 133 includes a partition to facilitate electrical isolation between one or more electrode pads 136 which may be coupled to the shading layer portions 133a, 133b, using electrodes 134a, 134b. For example, portion 133a may be electrically coupled via solder to the submount 150, and the portion 133b may be electrically coupled via solder to the laser diode 155. As shown in FIG. 1D, the light source 151 is positioned near the trailing edge of the TAR enabled write head 101.

The shading layer 133a includes an opening 137, for example a pinhole opening, having a substantially circular shape formed therethrough adjacent to the laser diode 155 (shown in FIG. 1B) of the light source 151 to facilitate the passage of radiation to a substrate. The opening 137 is positioned over the waveguide 135, as illustrated in FIG. 1E. It is to be noted that the opening 137 is not formed through the anti-reflective coating 132. In embodiment, the opening may have a diameter 137a of about 2 micrometers to about 8 micrometers. When the light volume distribution of the ABS of a slider is measured using an optical power detector, it is desirable to have a laser light leakage from the opening 137 of less than 1.0 percent.

The presence of the anti-reflective coating 132 reduces the reflection of light emitted from the light source 151 back towards the light source 151. Reflection of light back towards the light source 151 undesirably interferes with emitted light, for example, by altering the characteristics of the emitted light, thus negatively affecting processing.

FIGS. 1A-1E illustrate one embodiment of the invention; however, additional embodiments are also contemplated. In another embodiment, it is contemplated that the anti-reflective coating 132 may be formed on the side 131 only over the waveguide 135 or within the opening 137, rather than a blanket deposition over the entire side 131.

Figure 2A:
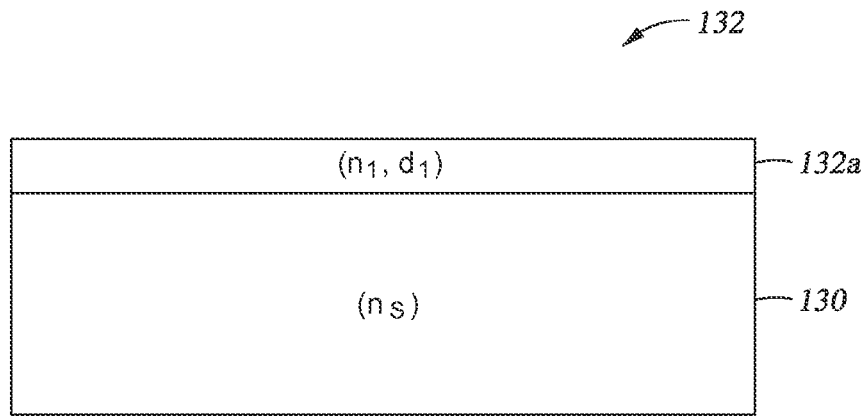
FIG. 2A illustrates a slider having a single anti-reflective layer thereon.

FIG. 2A illustrates a slider 130 having an anti-reflective coating 132 formed from a single anti-reflective layer 132A having a refractive index $n_1$ and thickness $d_1$. The slider 130 has a refractive index $n_s$. The single anti-reflective layer 132A may be formed from silicon dioxide, and may be deposited using atomic layer deposition, chemical vapor deposition, and the like. In one example, the anti-reflective coating is a single layer and has a refractive index less than a refractive index of the slider.

Figure 2B:
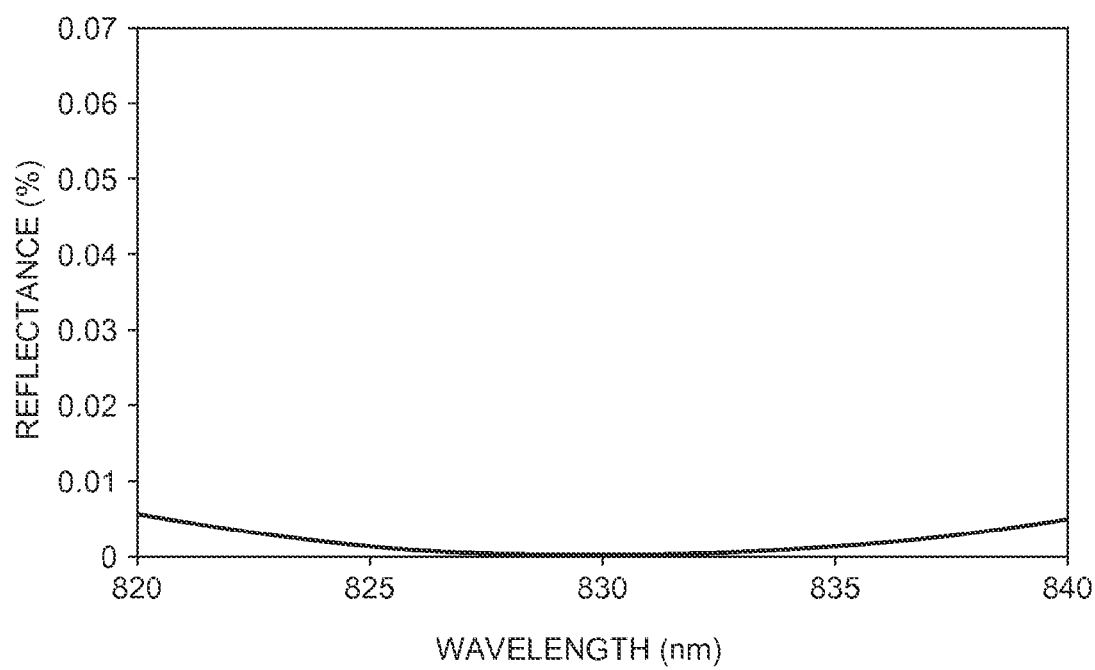
FIG. 2B illustrates a graph of wavelength versus percent reflectance for a slider having a single anti-reflective layer thereon.

FIG. 2B illustrates a graph of wavelength versus percent reflectance for a slider 130 having an anti-reflective coating 132 formed from a single anti-reflective layer 132A comprising silicon dioxide. As illustrated, the silicon dioxide anti-reflective layer has a reflectance of approximately zero for light with a wavelength of 830 nanometers (nm). As the wavelength of light increases or decreases from 830 nm, the reflectance of the light from the anti-reflective coating increases. At wavelength of about 820 nm or 840 nm, the percent reflectance of the light is about 0.005.

In one example, the reflectance of single anti-reflective layer 132A may be calculated using Equation 1:

$$R = \frac{(1+n_1^2)(n_1^2+n_s^2) - 4n_1^2 n_s + (1-n_1^2)(n_1^2-n_s^2)\cos\delta}{(1+n_1^2)(n_1^2+n_s^2) + 4n_1^2 n_s + (1-n_1^2)(n_1^2-n_s^2)\cos\delta}$$ (Equation 1)

$$\delta = \frac{4\pi n_1 d_1}{\lambda}$$

"Thin Films", KINBARA, Akira and FUJIWARA, Hideo, Shokabo, Page 198

Where $n_1$ is the refractive index of the material of the anti-reflective layer 132A, $n_s$ is the refractive index of the slider, $d_1$ is the thickness of the anti-reflective layer 132A, and $\lambda$ is wavelength of the light source. In one embodiment, $d_1$ may be less than or equal to $\lambda/2$, such as about $\lambda/4$. The refractive index of silicon dioxide is about 1.45. Utilization of a anti-reflective layer of silicon dioxide reduces reflection from about 12.6 percent (in the absence of an anti-reflective layer) to about 0.1 percent or less in the wavelength range of about 820 nm to about 840 nm (for $\lambda_{LD}$=830 nm).

Figure 3A:
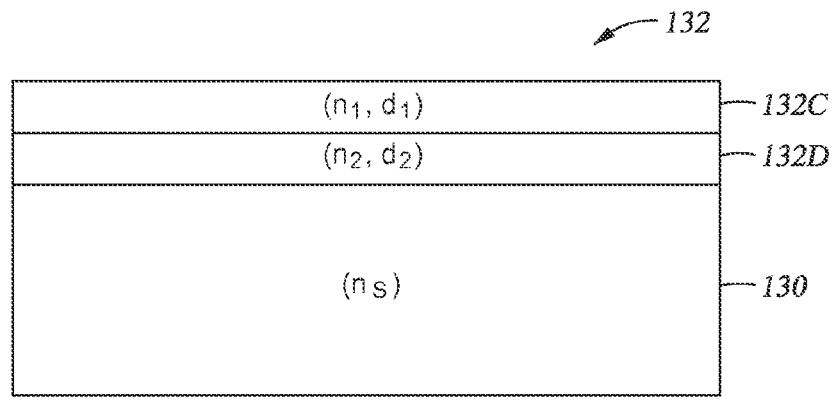
FIG. 3A illustrates a slider having two anti-reflective layers thereon.

FIG. 3A illustrates a slider 130 having an anti-reflective coating 132 formed from two anti-reflective layers 132C, 132D. A first anti-reflective layer 132D is disposed on a surface of the slider 130, and a second anti-reflective layer 132C is disposed on the first anti-reflective layer 132D. The first anti-reflective layer 132D and the second anti-reflective layer 132C may be formed from silicon dioxide, diamond-like carbon, titanium dioxide ($TiO_2$), or tantalum pentoxide ($Ta_2O_5$), and may be deposited using atomic layer deposition, chemical vapor deposition, and the like. It is contemplated that the first anti-reflective layer 132D and the second anti-reflective layer 132C may be formed from the same or different materials. In one example, the upper layer may be silicon dioxide and the lower layer may be one of diamond like carbon, titanium dioxide or tantalum pentoxide. In one example, the anti-reflective coating includes two layers, and wherein one of the two layers has a refractive index greater than the refractive index of the slider, and the second of the two layers has a refractive index less than the refractive index of the slider.

In one embodiment, the maximum reflectance of a two layer anti-reflective coating may be calculated using Equation 2:

$$R_{max} = \left(\frac{n_1^2 - n_0 n_s}{n_1^2 + n_0 n_s}\right)^2$$ (Equation 2)

"Optical thin films and devices", YOSHIDA, Sadafumi and YAJIMA, Hiroyoshi, University of Tokyo Press, Page 149

For a situation where $n_1 d_1 = n_2 d_2/2 = \lambda/4$. In equation 2, $n_1$ is the refractive index of 132C, $d_1$ is the thickness of 132C, $n_2$ is the refractive index of 132D, $d_2$ is the thickness of 132D, and $n_0$ is the refractive index of the medium environment (e.g., $n_0$=1 for air).

Figure 3B:
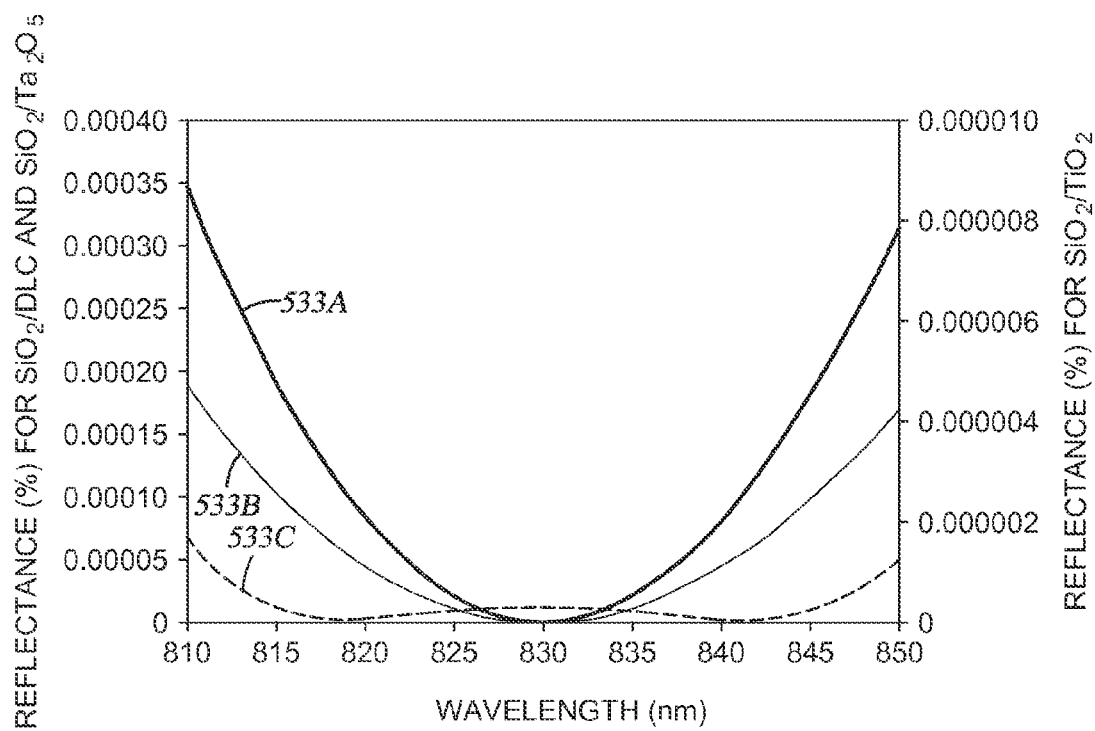
FIG. 3B illustrates a graph of wavelength versus percent reflectance for a slider having two anti-reflective layers thereon.

FIG. 3B illustrates a graph of wavelength versus percent reflectance for a slider having an anti-reflective coating formed from two anti-reflective layers. The line 533A represents an anti-reflective coating 132 having a second anti-reflective layer 132C formed from silicon dioxide having a refractive index of 1.45 and a thickness of 143 nm disposed over a first anti-reflective layer 132D formed from diamond-like carbon having a refractive index of 2.0 and a thickness of 208 nm. As illustrated in FIG. 3B, the anti-reflective coating represented by line 533A has about zero reflectance for light of about 830 nm, a reflectance of about 0.00035 percent at 810 nm, and a reflectance of about 0.00032 at 850 nm.

The line 533B in FIG. 3B represents an anti-reflective coating 132 having an anti-reflective layer 132C formed from silicon dioxide having a refractive index of 1.45 and a thickness of 143 nm disposed on an anti-reflective layer 132D formed from tantalum pentoxide having a refractive index of 2.13 and a thickness of 195 nm. The anti-reflective coating 132 represented by line 533B has a percent reflectance of about zero for light having a wavelength of 830 nm, a percent reflectance of about 0.00018 for light having a wavelength of 810 nanometers, and a percent reflectance of about 0.00017 for light having a wavelength of 850 nm.

The line 533C in FIG. 3B represents an anti-reflective coating 132 having an anti-reflective layer 132C formed from silicon dioxide (having a refractive index of 1.45 and a thickness of about 143 nm) disposed on an anti-reflective layer 132D formed from titanium dioxide (having a refractive index of 2.52 and a thickness of 163 nm). The anti-reflective coating 132 represented by line 533C has a percent reflectance of about 0.0000005 for light having a wavelength of 830 nm, a percent reflectance of about zero for light having wavelengths of about 818 nm and 842 nm, a percent reflectance of about 0.0000017 for light having a wavelength of 810 nanometers, and a percent reflectance of about 0.0000013 for light having a wavelength of 850 nm.

Figure 4A:
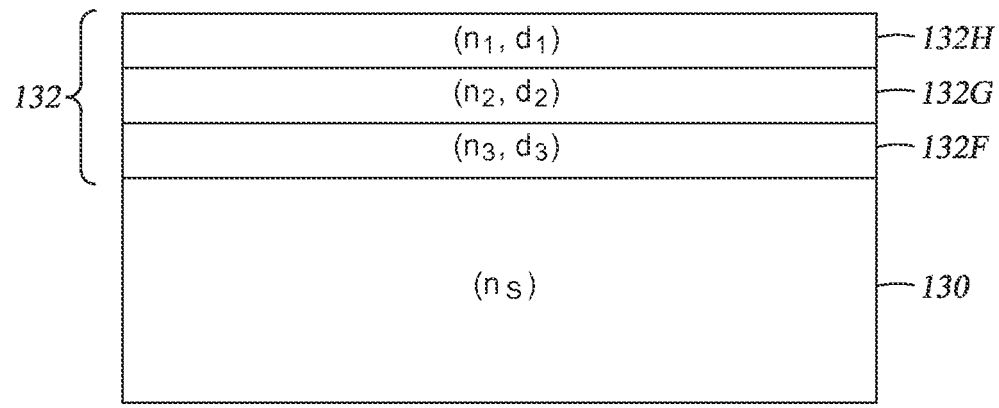
FIG. 4A illustrates a slider having three anti-reflective layers thereon.

FIG. 4A illustrates a slider 130 having an anti-reflective coating 132 formed from three anti-reflective layers 132H, 132G, 132F. The anti-reflective layers may be formed diamond-like carbon or aluminum oxide ($Al_2O_3$), and may be deposited using atomic layer deposition, chemical vapor deposition, and the like. The anti-reflective layers 132F, 132G, and 132H may all be different materials, or may include duplicative materials.

As shown in FIG. 4A, when the refractive index of layers are defined as $n_1$ (layer 132h), $n_2$ (layer 132g), $n_3$ (layer 132f), and film thickness are set to $d_1$, $d_2$, and $d_3$, the relation of a wavelength, a refractive index, and layer thickness is shown by $n_1 d_1 = n_2 d_2 = n_3 d_3 = \lambda_0/4$, and $n_1 d_1 = n_2 d_2/2 = n_3 d_3 = \lambda_0/4$.

In one example, layer 132h is $Al_2O_3$ (refractive index equals 1.65, thickness is 126 nm), layer 132G is DLC (refractive index equals 2.3, thickness is 90 nm), and layer 132f is DLC (refractive index equals 2.0, thickness is 104 nm). The resulting structure produces a reflectance of about 0.1 percent or less, as illustrated in FIG. 4B.

Figure 4B:
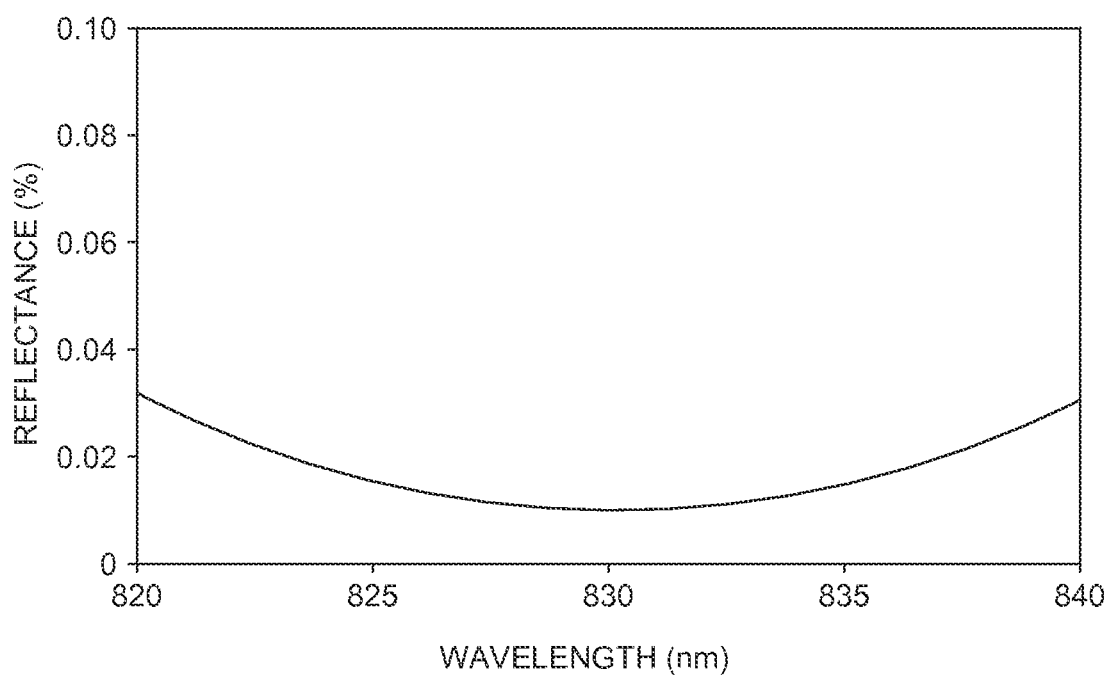
FIG. 4B illustrates a graph of wavelength versus percent reflectance for a slider having three anti-reflective layers thereon.

FIG. 4B illustrates a graph of wavelength versus percent reflectance for a slider 130 having an anti-reflective coating formed from three anti-reflective layers 132F, 132G, 132H. The anti-reflective coating includes a percent reflectance of about 0.01 for light having a wavelength of 830 nm, a percent reflectance of 0.03 for light having a wavelength of 820 nm and 840 nm.

In the case of 3 or more anti-reflective layers, for a $j_{th}$ layer having a refractive index $n_j$ and a phase layer thickness of $\delta_j = 2\pi n_j d_j/\lambda$ ($d_j$: thickness), the characteristic matrix of n-layer multilayering is shown in Equation 4:

$$\begin{pmatrix} M_{11} & iM_{12} \\ iM_{21} & M_{22} \end{pmatrix} = \prod_{j=1}^{N} \begin{pmatrix} \cos \delta_j & in_j^{-1} \sin \delta_j \\ in_j \sin \delta_j & \cos \delta_j \end{pmatrix}$$ (Equation 4)

If all layers are transparent, the coefficient $M_{ij}$ is a real number and can be expressed as follows:

$$R = \frac{n_0 M_{11} - n_s M_{22} + i(n_0 n_s M_{12} - M_{21})}{n_0 M_{11} + n_s M_{22} + i(n_0 n_s M_{12} + M_{21})}$$ (Equation 5)

Where, $n_0$: incidence medium, $n_s$: reflective index of slider. The conditions of reflectance equaling are met when: $n_0 M_{11} - n_s M_{22} = 0$ and $n_0 n_s M_{12} - M_{21} = 0$. ("Optical thin films and devices" YOSHIDA, Sadafumi and YAJIMA, Hiroyoshi, University of Tokyo Press, Page 149-150).

It is to be noted that while sliders having one, two, or three anti-reflective layers thereon are illustrated, it is contemplated that sliders may include more than three anti-reflective layers thereon.

Figure 5:
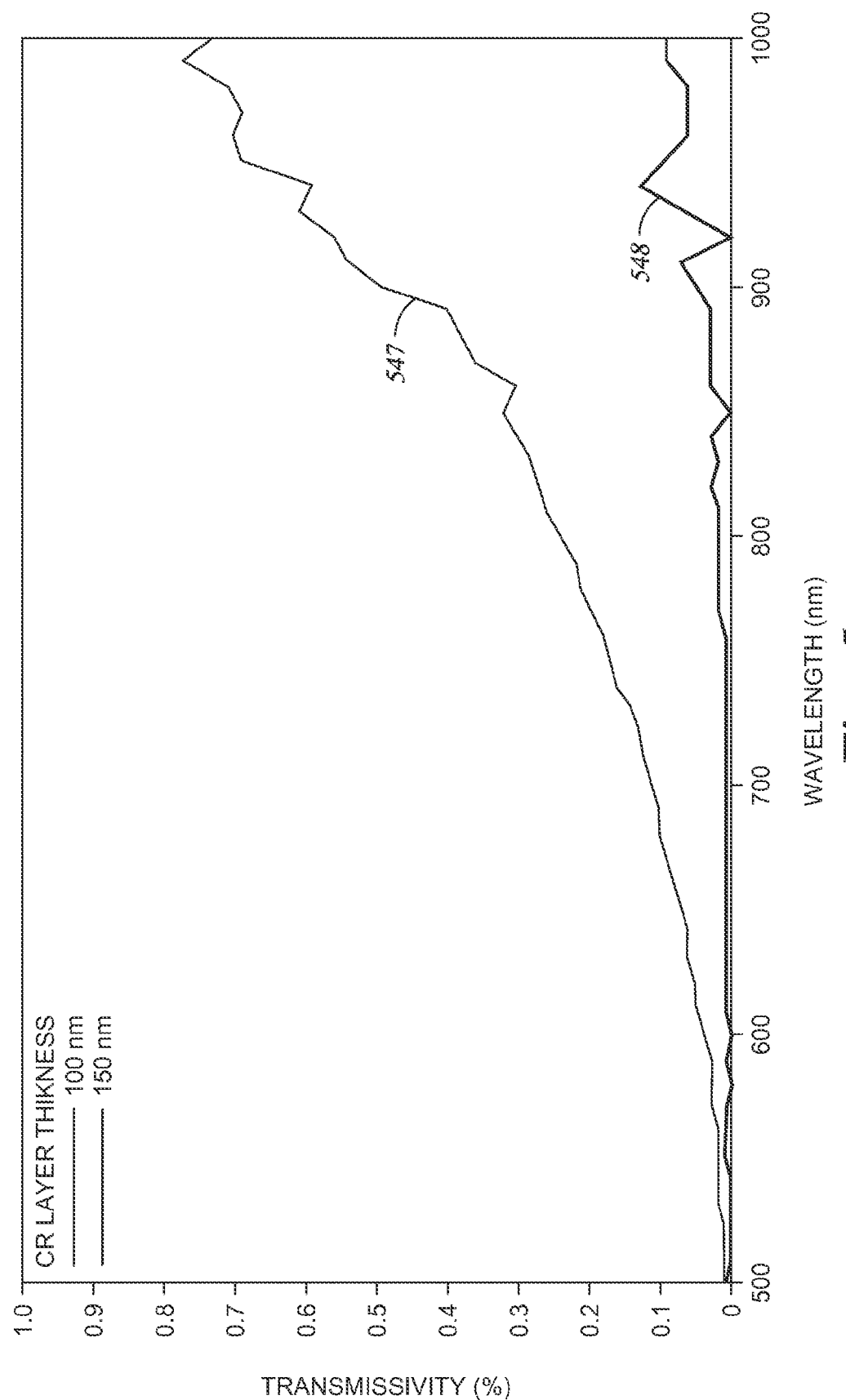
FIG. 5 illustrates a graph of transmissivity for shading layers, according to embodiments of the invention.

FIG. 5 illustrates a graph of transmissivity for shading layers, according to embodiments of the invention. Line 547 represents the transmissivity of a shading layer formed from chromium and having a thickness of about 100 nm. As illustrated in FIG. 5, the transmissivity of the shading layer increases as the wavelength of light increases. The line 548 represents the transmissivity of a shading layer formed from chromium and having a thickness of about 150 nm. By increasing the thickness of the shading layer to 150 nm, the transmissivity remains less than about 0.15 percent, irrespective of wavelength within the range of 500-1000 nm laser wavelength. When using a shading layer including chromium having a thickness of about 100 nm, transmissivity is about 1 percent or less. By increasing the thickness of the shading layer above 100 nm, the likelihood of the shading layer peeling from the substrate is reduced. What is necessary is just the thickness in which a pinhole part can peel by the liftoff method.

Figure 6:
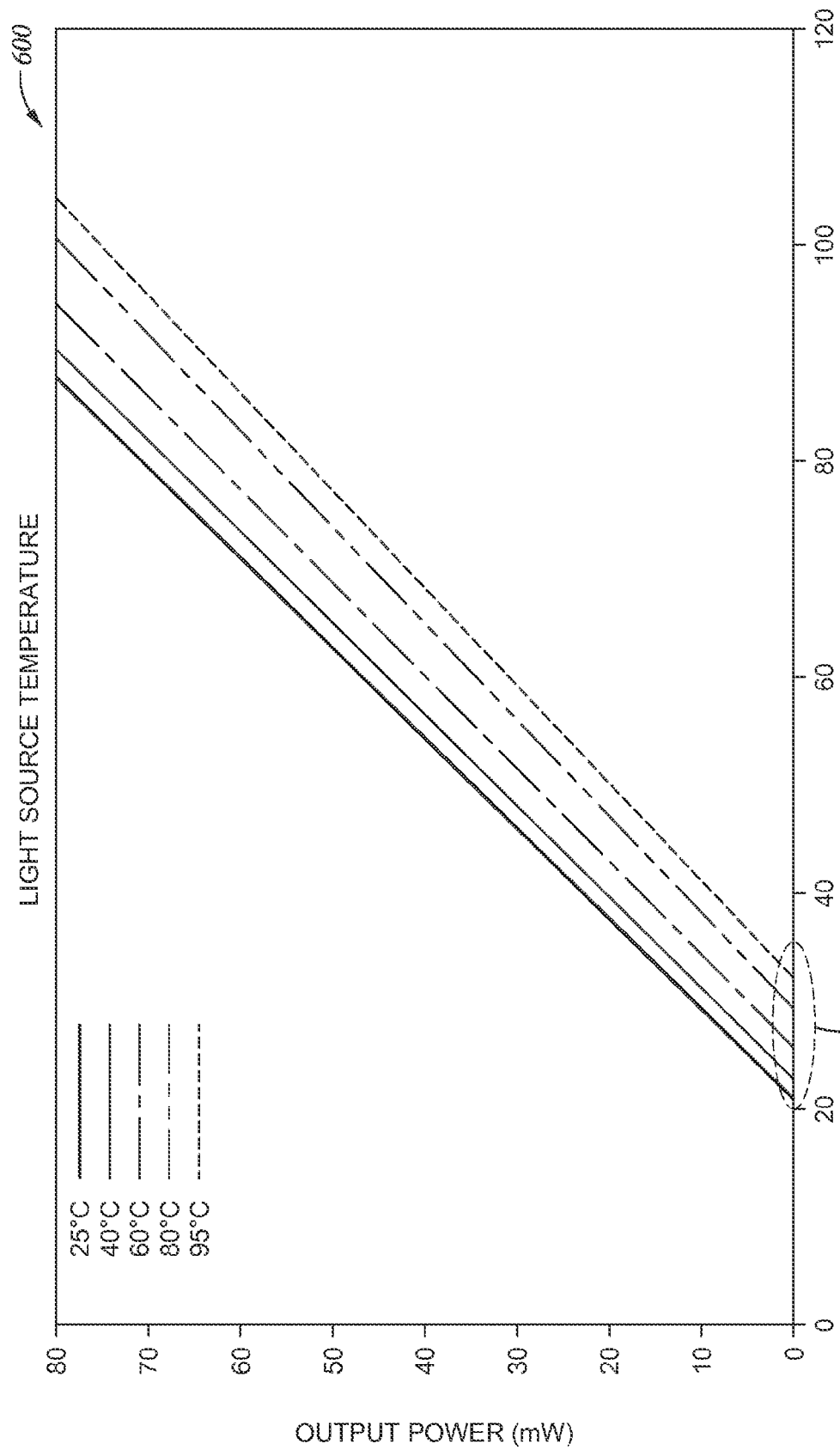
FIG. 6 is a graph illustrating injection-current light output characteristics of a laser.

FIG. 6 is a graph 600 illustrating injection-current (I-L) light output characteristics of a laser. The I-L characteristic illustrates the relation of detected power to forward direction current provided to a laser. Above the indicated threshold current, a substantially linear relationship for current versus output power is maintained. Additionally, it is to be noted that the current required to accomplish a predetermined output power is temperature dependent. Thus, as temperature of the light source increases, the current must be increased to maintain the same output. Reflected or returned light can change the power the laser; however, a power change of less than 5 percent is generally acceptable for stable heat-assisted magnetic recording.

As shown in FIG. 6, the amount of current necessary to generate constant power increases as laser temperature increases. At increasingly high temperatures, such as about above 90 degrees Celsius, a laser may not be able to generate sufficient power levels. However, although the ambient temperature used in HDD is as high as about 50 degrees Celsius, no additional temperature control is provided. Therefore, when temperature of laser (at 30 mW) is set to about 60 degrees Celsius, and alignment of the laser diode shifts, additional current is necessary to maintain constant power output. Assuming a normal operating temperature within a laser diode is less than about 90 degrees Celsius, the time to reach the maximum temperature of the laser diode should be dictated by: $d\lambda/dT=0.3$ nm/degree, wherein $\lambda$ is the oscillation wavelength. When a laser diode performs a 30 degree Celsius rise in heat of from 60° C. to 90° C. subject to the relation of $d\lambda/dT=0.3$ nm/degree, a maximum desirable increase in laser diode wavelength is about 10 nm ($\lambda_{LD}+10$ nm), while a maximum decrease is about 5 nm ($\lambda_{LD}-5$ nm).

Figure 7A:
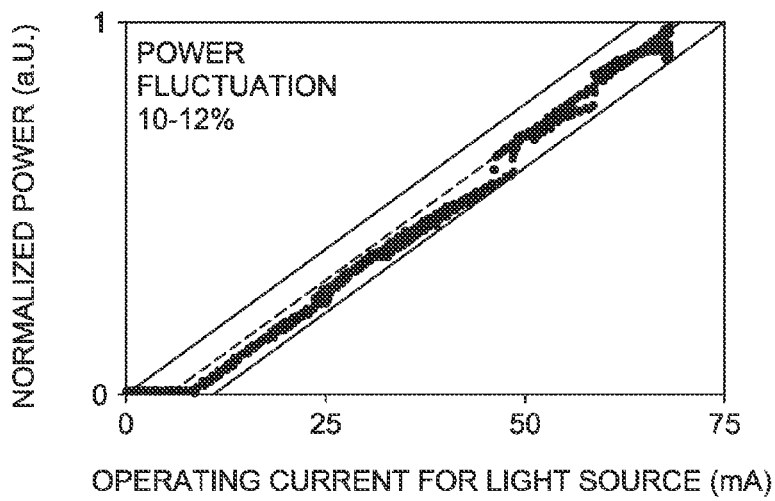
FIGS. 7A-7C illustrate the relationship between laser power and anti-reflective layers, according to embodiments of the invention.
Figure 7B:
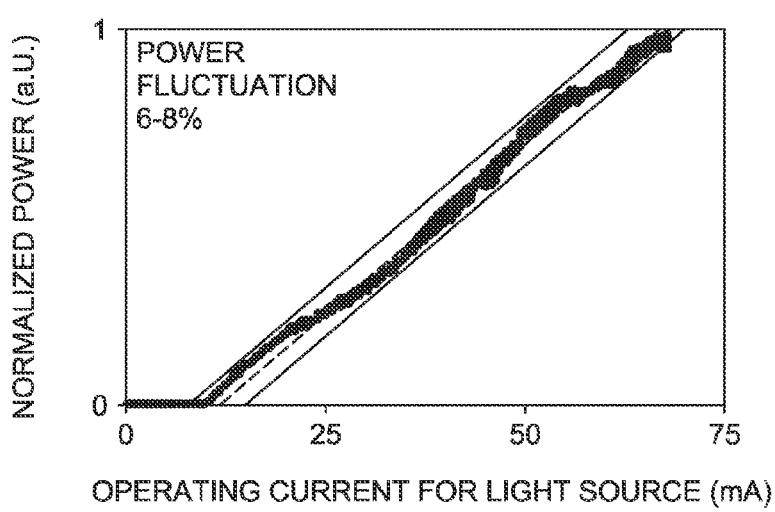
Figure 7C:
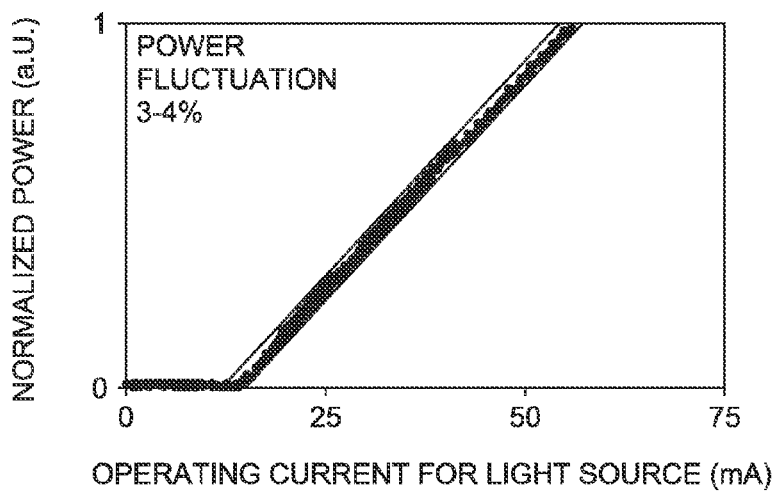

FIGS. 7A-7C illustrate the relationship between laser power and anti-reflective layers, according to embodiments of the invention. During processing, the reflection of light back to the light source results in change of laser power. For example, as shown in FIG. 7A, a power fluctuation of 10% to about 12% is possible when utilizing a slider which does not include an anti-reflective coating thereon. As shown in FIG. 7B, an anti-reflective coating having a percent reflectance greater than about 0.1 results in a power fluctuation of about 6-8 percent. As illustrated in FIG. 7C, an anti-reflective coating having a percent reflectance less than about 0.1 results in a power fluctuation of about 3-4 percent. That is, the anti-reflective coating can control characteristic degradation of a laser diode by interference of a flex surface and the end surface of laser diode by utilizing an anti-reflective coating having a reflectance 0.1% or less. The reduction in power fluctuation facilitated by the inclusion of an anti-reflective coating on a slider improves process uniformity.

Benefits of embodiments described herein include reduced reflectance of light from the upper surface of the slider, thus resulting in more uniform processing. The reduced reflection of light facilitates a more uniform wavelength of light emitted from a light source by reducing power fluctuation within the light source.

Figure 8:
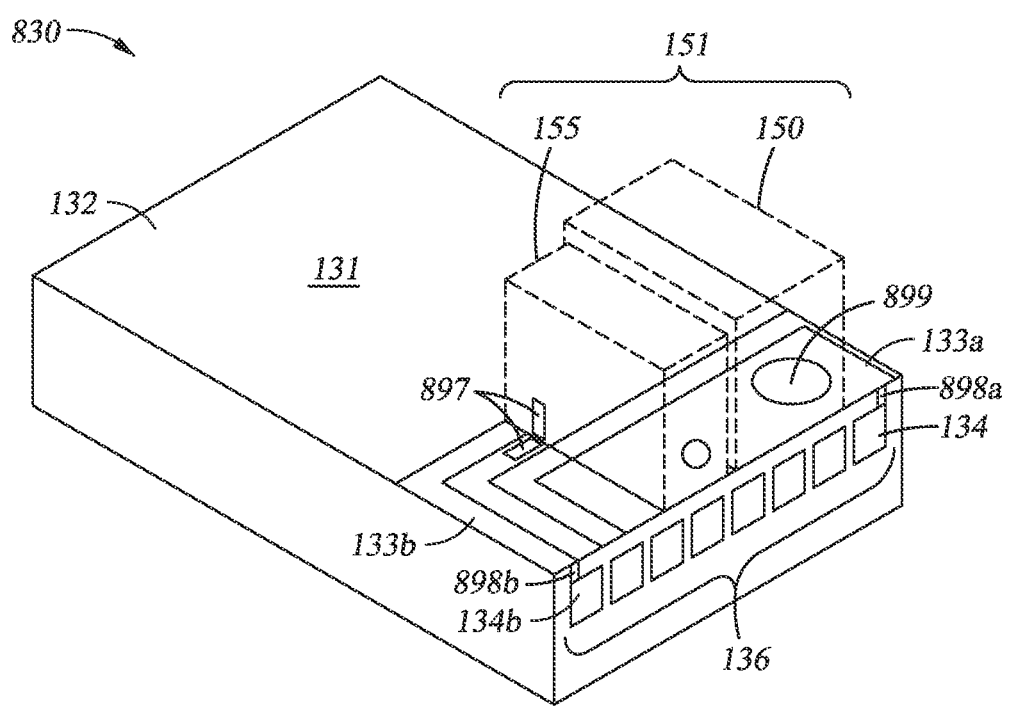
FIG. 8 illustrates a hard disk drive system having solder pads, according to one embodiment of the invention.

FIG. 8 illustrates a slider 830 including solder pads, according to one embodiment of the invention. The slider 830 is similar to the slider 130, except solder pads 897 and 899 are utilized to facilitate electrical connections on the slider 830. For example, solder pad 897 electrically couples the laser diode 155 to portion 133b. Solder pad 898 electrically couples an electrode pad 136 to portion 133a. Solder pad 899 electrically couples the portion 133a to the submount 150. 898a and 898b are electrodes for LD, respectively.

While the foregoing is directed to embodiments of the present invention, other and further embodiments of the invention may be devised without departing from the basic scope thereof, and the scope thereof is determined by the claims that follow.

What is claimed is:

1. A hard disk drive, comprising:
a recording head having:
a slider having an air bearing surface and a side opposite the air bearing surface;
an anti-reflective coating deposited on the side opposite the air bearing surface; a shading layer disposed on the anti-reflective coating, the shading layer having an opening formed therethrough; and
a light source positioned over the shading layer.

2. The hard disk drive of claim 1, wherein the shading layer comprises chromium.

3. The hard disk drive of claim 1, wherein the transmissivity of the chromium is less than 1 percent.

4. The hard disk drive of claim 1, wherein the shading layer is partitioned and includes multiple portions.

5. The hard disk drive of claim 1, wherein the anti-reflective coating is a single anti-reflective layer.

6. The hard disk drive of claim 1, wherein the anti-reflective coating comprises two anti-reflective layers.

7. The hard disk drive of claim 6, wherein the two antireflective layers include a layer of silicon dioxide disposed on a layer of diamond-like carbon.

8. The hard disk drive of claim 6, wherein the two antireflective layers include a layer of silicon dioxide disposed on a layer of tantalum pentoxide.

9. The hard disk drive of claim 6, wherein the two antireflective layers include a layer of silicon dioxide disposed on a layer of titanium dioxide.

10. The hard disk drive of claim 1, wherein the antireflective coating comprises three anti-reflective layers.

11. The hard disk drive of claim 5, wherein the thickness of a single anti-reflective layer is less than one-half the wavelength of light emitted by the light source.

12. The hard disk drive of claim 1, wherein the anti-reflective coating is a single layer and has a refractive index less than a refractive index of the slider.

13. The hard disk drive of claim 1, wherein the anti-reflective coating includes two layers, and wherein one of the two layers has a refractive index greater than the refractive index of the slider, and the second of the two layers has a refractive index less than the refractive index of the slider.

14. The hard disk drive of claim 13, wherein the first layer of the two layers comprises diamond-like carbon, tantalum pentoxide, or titanium dioxide.

15. The hard disk drive of claim 1, wherein the opening has a diameter within a range of about 2 micrometers to about 8 micrometers.

16. The hard disk drive of claim 1, wherein the anti-reflective coating has a reflectance less than about 0.1 percent.

17. A hard disk drive, comprising:
a recording head having:
a slider having an air bearing surface and a side opposite the air bearing surface; an anti-reflective coating deposited on the side opposite the air bearing surface, the anti-reflective coating having a reflectance less than about 0.1 percent;
a shading layer comprising chromium disposed on the anti-reflective coating, the shading layer having an opening formed therethrough; and
a light source positioned over the shading layer.

18. The hard disk drive of claim 17, wherein the anti-reflective coating includes a single anti-reflective layer.

19. The hard disk drive of claim 18, wherein the thickness of the single anti-reflective layer is less than one-half the wavelength of light emitted by the light source.

20. The hard disk drive of claim 17, wherein the anti-reflective coating comprises three anti-reflective layers.

21. The hard disk drive of claim 17, wherein the anti-reflective coating comprises two anti-reflective layers.

22. The hard disk drive of claim 17, wherein the anti-reflective coating is a single layer and has a refractive index less than a refractive index of the slider.

23. The hard disk drive of claim 17, wherein the anti-reflective coating includes two layers, and wherein one of the two layers has a refractive index greater than the refractive index of the slider, and the second of the two layers has a refractive index less than the refractive index of the slider.

24. A hard disk drive, comprising:
a magnetic head, having:
a slider having an air bearing surface and a side opposite the air bearing surface;
an anti-reflective coating deposited on the side opposite the air bearing surface, the anti-reflective coating having a reflectance less than about 0.1 percent, and comprising at least one material selected from the group consisting of silicon dioxide, diamond-like carbon, titanium dioxide, and tantalum pentoxide;
a shading layer comprising a metal thin film disposed on the anti-reflective coating, the shading layer having an opening formed therethrough, the opening having a diameter within a range of about 2 micrometers to about 8 micrometers; and
a light source positioned over the shading layer, the light source comprising a laser.

25. The hard disk drive of claim 24, further comprising solder electrically coupling the metal thin film to the laser, wherein the metal thin film functions as an electrode or solder pad for the laser.

* * * * *